(12) United States Patent
Coenraets

(10) Patent No.: US 10,961,773 B2
(45) Date of Patent: Mar. 30, 2021

(54) DEVICE FOR COVERING A SURFACE INCLUDING INTERLOCKING MEANS

(71) Applicant: BECOFLEX, Strepy-Bracquegnies (BE)

(72) Inventor: Benoit Coenraets, Strepy-Bracquegnies (BE)

(73) Assignee: BECOFLEX, Strepy-Bracquegnies (BE)

( * ) Notice: Subject to any disclaimer, the term of this patent is extended or adjusted under 35 U.S.C. 154(b) by 153 days.

(21) Appl. No.: 16/069,559

(22) PCT Filed: Jan. 26, 2017

(86) PCT No.: PCT/IB2017/000039
§ 371 (c)(1),
(2) Date: Jul. 12, 2018

(87) PCT Pub. No.: WO2017/130053
PCT Pub. Date: Aug. 3, 2017

(65) Prior Publication Data
US 2019/0010757 A1    Jan. 10, 2019

(30) Foreign Application Priority Data
Jan. 25, 2016  (BE) .................................. 2016/5058

(51) Int. Cl.
*E04H 4/10*    (2006.01)
*E06B 9/58*    (2006.01)
(Continued)

(52) U.S. Cl.
CPC .............. *E06B 9/581* (2013.01); *A63C 19/12* (2013.01); *B60J 7/085* (2013.01);
(Continued)

(58) Field of Classification Search
CPC ........ A63C 19/12; B60J 7/085; Y02A 40/258; A01G 9/227; E04H 4/101; E04H 4/10;
(Continued)

(56) References Cited

U.S. PATENT DOCUMENTS 3,070,811 A * 1/1963 Bender .................... E04H 4/101
4/502
3,273,171 A * 9/1966 Lamb ....................... E04H 4/101
4/502
(Continued)

FOREIGN PATENT DOCUMENTS

CA    2115113 A1    8/1995
DE    2257231 A1    5/1974
(Continued)

OTHER PUBLICATIONS

Technics & Applications, "Automatic Swimming Pool Covers", 2018, Technics & Applications, Klaus-Michael Kuehnelaan 9, B-2440 Geel-Belgium, info@aquatop.be; http://www.t-and-a.be/; Retrieved from the Internet on Oct. 2, 2018.

*Primary Examiner* — Johnnie A. Shablack
(74) *Attorney, Agent, or Firm* — Blue Filament Law PLLC

(57) ABSTRACT

A device (1) for covering a surface is provided. The device includes: (a) a cover (10) of which each longitudinal edge is provided with a bead (12); (b) a rotatably mounted drum (2) capable of winding or unwinding the cover, movable on rails placed on either side of said surface; and (c) a system for continuously locking/unlocking the bead in the rails during the translation of the drum.

19 Claims, 11 Drawing Sheets

(51) Int. Cl.
   *A63C 19/12* (2006.01)
   *B60J 7/08* (2006.01)
   *E04F 10/06* (2006.01)
   *A01G 9/22* (2006.01)
   *B60J 1/20* (2006.01)

(52) U.S. Cl.
   CPC ......... *E04F 10/0607* (2013.01); *E04H 4/101* (2013.01); *A01G 9/227* (2013.01); *A63C 2203/12* (2013.01); *B60J 1/2019* (2013.01)

(58) Field of Classification Search
   CPC . E04H 4/108; E04H 4/084; E06B 2009/1743; E06B 9/58; E06B 9/581
   USPC .................................. 160/243, 242, 246, 249
   See application file for complete search history.

(56) References Cited

U.S. PATENT DOCUMENTS

| | | | | |
|---|---|---|---|---|
| 3,398,779 A | * | 8/1968 | Kuss | E06B 9/64 160/243 |
| 3,574,979 A | | 4/1971 | Chan | |
| 4,001,900 A | | 1/1977 | Lamb | |
| 4,195,370 A | | 4/1980 | Budd | |
| 4,464,801 A | * | 8/1984 | Lamb | E04H 4/101 4/502 |
| 4,466,143 A | * | 8/1984 | Lamb | E04H 4/101 4/498 |
| 4,494,256 A | * | 1/1985 | Radtke | E04H 4/101 4/502 |
| 4,792,178 A | * | 12/1988 | Kokx | B60J 7/068 160/266 |
| 5,725,173 A | * | 3/1998 | Yasnogorodskiy | B65H 16/00 160/24 |
| 5,738,294 A | * | 4/1998 | Yasnogorodskiy | B65H 16/00 160/24 |
| 5,845,343 A | * | 12/1998 | Last | E04H 4/10 4/502 |
| 5,920,922 A | * | 7/1999 | Ragsdale | E04H 4/101 4/498 |
| 5,930,848 A | | 8/1999 | Last | |
| 6,691,334 B2 | | 2/2004 | St-Hilaire | |
| 6,991,700 B2 | * | 1/2006 | Smith | E04H 4/101 156/308.4 |
| 7,086,445 B2 | * | 8/2006 | Curry | E04H 4/082 160/243 |
| 8,418,279 B2 | * | 4/2013 | Coenraets | B60J 7/085 4/502 |
| 9,366,045 B2 | * | 6/2016 | Coenraets | B60J 7/085 |
| 9,546,492 B2 | * | 1/2017 | Coenraets | E04H 4/101 |
| 10,550,592 B2 | * | 2/2020 | Coenraets | B60J 7/085 |
| 2001/0023506 A1 | | 9/2001 | Mathis et al. | |
| 2003/0173795 A1 | * | 9/2003 | Dumas | B60J 7/068 296/98 |
| 2005/0097834 A1 | | 5/2005 | King et al. | |
| 2010/0004076 A1 | * | 1/2010 | Hansez-Gonne | A63C 19/12 473/504 |
| 2011/0290433 A1 | * | 12/2011 | Coenraets | E04H 4/101 160/311 |
| 2014/0000021 A1 | * | 1/2014 | Scheps | E04H 4/101 4/498 |
| 2015/0284969 A1 | * | 10/2015 | Coenraets | A63C 19/12 150/154 |
| 2016/0047134 A1 | * | 2/2016 | Coenraets | A63C 19/12 160/243 |

FOREIGN PATENT DOCUMENTS

| | | |
|---|---|---|
| EP | 1719858 A2 | 11/2006 |
| FR | 2652373 A1 | 3/1991 |
| FR | 2743502 A1 | 7/1997 |
| FR | 2789425 A1 | 8/2000 |
| FR | 2803769 A1 | 7/2001 |
| FR | 2893651 A1 | 5/2007 |
| FR | 2900951 A1 | 11/2007 |
| GB | 2199741 A | 7/1988 |
| GB | 2379163 A | 3/2003 |
| WO | 2005026473 A1 | 3/2005 |
| WO | 2007036625 A1 | 4/2007 |
| WO | 2010010152 A1 | 1/2010 |
| WO | 2010054960 A1 | 5/2010 |
| WO | 2012095264 A1 | 7/2012 |
| WO | 2014064138 A1 | 5/2014 |

\* cited by examiner (a)

(b)

(a)    (b)

DEVICE FOR COVERING A SURFACE INCLUDING INTERLOCKING MEANS

FIELD OF THE INVENTION

The invention relates to a device for covering a surface, that is easy to implement and better meets the requirements of the relevant application. In particular, the present invention relates to a covering device in which the cover comprises a particular securing system to allow the longitudinal edges of the cover to be reversibly anchored as the cover is deployed.

TECHNOLOGY BACKGROUND

Covers are applied to surfaces for reasons which are dependent on the nature of these surfaces. Thus, in the case of a basin such as a swimming pool the cover may prevent contamination with leaves or by animals, may allow savings on energy, water and reagents, and may or must afford the safety of individuals and particularly children. In the case of a desalination basin or basin used for other fluid treatments, a cover makes it possible to avoid the liquid becoming diluted with rainwater or excessive evaporation due to heat. In the case of a sports ground such as a grass-court or clay-court tennis court, a cover affords protection against inclement weather, and in particular intermittent rain. Moreover, a vehicle body is covered notably to ensure that the load remains stable in the depression caused by the movement of the vehicle and to protect same against inclement weather. Covers are also used as blinds for greenhouses, conservatories or vehicle windows in order to prevent any overheating inside, and as sunscreens for patio awnings.

In all instances, the search is generally for a covering device that is economical allowing easy, dependable, repeatable and quick covering and uncovering, requiring a minimum of human intervention and, above all, that has the longest life possible. Numerous devices for covering a surface has been developed, ranging from basic models to more sophisticated ones. For example, a first entirely basic device used in the case of a swimming pool comprises a cover which may or may not be inflatable which is unrolled, stretched out and secured by hand to the edges of the pool. This type of device is illustrated for example in documents U.S. Pat. No. 6,691,334, GB2379163 and FR2652373. It is clear that, given the handling and storage requirements, these relate only to fairly small sized pools.

For surfaces of larger size recourse may be had to covering devices that also have a drum fixed to one of the transverse ends of the surface that is to be protected. The cover is deployed manually by pulling, unrolling from the drum, to cover the surface. The weight and dimensions of the cover entail the intervention of several individuals so that it can be set in place suitably. The cover is removed by rolling it up around the drum by rotation: the cover therefore removes itself from the surface by sliding along same. The rotation of the drum in order to remove the cover is performed manually or by means of an electric motor having enough power to pull the fully deployed cover. It should be emphasized that ease of deployment of the cover, particularly in the case of a swimming pool, is a contributory factor to safety because a device that is awkward to handle will not be readily used. The deployment (which means to say the unrolling from the drum) and the removal (which means to say the rolling back up on the drum) of the cover can be performed manually or automatically using a motor. Automatic covering devices are illustrated notably in the following documents: U.S. Pat. No. 3,574,979, GB2199741, US2005/0097834, CA2115113, US2001/0023506, U.S. Pat. Nos. 5,930,848, 4,001,900 and on the web site www.a-quatop.be. However, this type of covering device with a fixed drum as mentioned hereinabove has the major disadvantage of making the cover slide, as it is dragged over the surface that is to be protected while it is being deployed and removed, thus causing premature wearing thereof and additional work due to the friction thus generated.

In the present application, the terms "longitudinal" "transverse" and derivatives thereof refer respectively to the direction of travel of the drum and to the direction of the axis of revolution thereof.

In order to alleviate the disadvantages of fixed-drum devices, there is an alternative type of drum-operated covering device, in which the motorized drum is mounted on a longitudinal-translation mechanism. This mechanism moves the drum over the surface that is to be covered literally allowing the cover to be "laid" on the surface, as it deploys, by unrolling it from the drum simultaneously with the longitudinal movement thereof, and then lifted off, as it is removed, by simultaneously rolling it up on the drum. The cover therefore does not slide over the surface either when it is being deployed or when it is being removed. The covering device also comprises a system for securing the covering to one transverse end of the surface that is to be covered so that the translational and rotational movement of the drum cause the cover to be unrolled or rolled up over the surface that is to be covered. Examples of automatic devices of this type are disclosed for example in the following documents: WO2005/026473, FR2900951, DE2257231, FR2893651, FR2789425, FR2743502, EP1719858. Furthermore, a fully manual alternative form of a drum mounted with facility for longitudinal translation is illustrated in documents WO2007/036625 and U.S. Pat. No. 4,195,370.

The mobile-drum covering devices illustrated above plan only for one transverse edge of the cover to be secured to one transverse end of the surface that is to be covered, the opposite edge remaining attached to the drum. No system for securing the longitudinal edges of the cover is provided. In particular, in the case of a swimming pool, individuals encroaching upon the cover would not be held back by the longitudinal edges thereof and could thus be tipped into the water. Furthermore, the lack of sealing of the cover along its longitudinal edges could encourage the ingress of dirt, dead leaves and twigs into the pool, as well as small animals such as mice or snakes. More sophisticated devices have been proposed that allow the longitudinal edges of the cover to be secured reversibly as the cover is deployed, such as in document FR2803769 which provides a system for securing the longitudinal edges of the cover which system is made up of grid portions which are raised and then folded down portion by portion onto said longitudinal edges of the cover keeping these edges held down inside a channel as the cover is gradually unrolled. In this design, the longitudinal edges of the cover are trapped without being locked, thus affording a lower level of safety particularly in the case of swimming pools.

Another advantageous system which allows the longitudinal edges of the cover to be secured simultaneously with the deployment thereof and allows a transverse tensile force to be applied thereto in order to perfectly tension it as been described in WO2010/010152, WO2010/054960, WO2014/064138, WO2012/095264 and in Belgian patent application BE2012/0725. In these devices, the longitudinal edges of the cover are provided with a rod or bead which is introduced into the upward-facing opening of a U-section rail with one or two flanges partially closing said opening. The bead slips under a flange and is held in this position by suitable securing means that allow the longitudinal edges of the cover to be secured firmly. In such systems, deflection pulleys are generally used to guide and position the bead with respect to the opening in the corresponding rail during the translational movement in the first direction of the drum leading to the unrolling of the cover.

While such a type of locking system normally works well, it sometimes happens that the bead does not position itself correctly under the flange of the corresponding rail, thus not allowing the securing means to secure the relevant longitudinal edge of the cover securely. This situation is illustrated in FIG. 2 which in cross section shows a rail (6) in which the bead (12) of a cover (10) is inserted and fixed under a flange of the rail by securing means (31). FIG. 2(a) illustrates the securing system as it should work with the bead (12) arranged under the flange of the rail and blocked in this position by the securing means (31). FIG. 2(b) shows what might happen, particularly in the case of covers not subjected to transverse tensioning while they are deploying (for example in the case of floating covers for swimming pools). Although the bead has indeed slipped into the opening (14) in the rail, it is not arranged under the corresponding flange. As a result, the securing means (31) do not have enough space to be properly inserted and the longitudinal edge of the cover is not secured as firmly as it should be. This situation may prove dangerous, because, confident of the expected secureness of such a system, an individual many venture onto the cover the edges of which may become detached from the rails under the effect of the weight and their poor securing.

The present invention proposes a solution that makes it possible to guarantee correct securing of the longitudinal edges of a cover in the corresponding rails through systematic correct positioning of the beads of said longitudinal edges under the corresponding flanges of the rails.

SUMMARY OF THE INVENTION

The invention is as defined in the main claim and preferred alternative forms of embodiment are defined in the dependent claims. The present invention notably relates to a device for covering a surface comprising:
(a) a substantially rectangular cover having two longitudinal edges opposite one another and two transverse edges opposite one another, each longitudinal edge being equipped with a projecting bead extending along said edge,
(b) a drum mounted with the ability to rotate able to roll up and unroll the cover, said drum being mounted on a mechanism for longitudinal translation along rails placed one on each side of said surface and each made up of a profile section having an opening on one of its faces and facing away from the surface that is to be covered, said face comprising at least an adjacent flange situated on the side adjacent to the surface that is to be covered and partially closing said opening, said translation mechanism allowing longitudinal translation of the drum in a first direction that causes the cover to be unrolled and deployed over the surface that is to be covered and in a second direction that causes the cover to be rolled up and removed from said surface,
(c) a deflection surface provided on each side of the surface that is to be covered so as to guide and position said bead of each edge of the cover to face the opening in the corresponding rail as the drum effects the translational movement in the first direction causing the cover to unroll,
(d) a system for continuously locking the bead of longitudinal edges of the cover in the opening of said rails making it possible, once the bead has entered the opening, to lock it by wedging it under the adjacent flange of the corresponding rail as the cover is gradually unrolled and, as the drum effects the translational movement in the second direction, to release the bead allowing it to disengage as the cover is gradually rolled up.

The device of the present invention additionally comprises a bead engagement shoe slipped into each rail downstream of the deflection surfaces in the first direction of translation, said engagement shoe comprising:
(a) an upper portion, situated outside of the rails and fixed to the translation mechanism so as to move along the rails with the drum, and
(b) a lower portion, inserted in the opening in the corresponding rail, comprising a lower base the geometry of which is such that the bead is guided under the adjacent flange.

In a preferred alternative form of embodiment, the locking system additionally comprises two flexible belts (31), each one being able
during the translational movement of the drum in the first direction, to lay itself down gradually in the opening in the corresponding rail gradually as the cover is unrolled, once the bead has been engaged under the adjacent flange of this rail, thus wedging it therein, and
during the translational movement of the drum in the second direction, to remove itself from said opening, thus releasing the bead and allowing it to disengage as the cover is gradually rolled up.

In said preferred alternative form of embodiment, the movement mechanism advantageously comprises a carriage mounted on the rails and transversely overhanging the surface that is to be covered and supporting the drum comprising at each of its ends:
a drive wheel (9) the axis of rotation of which is parallel to that of said drum;
at least a first downstream roller and at least a second upstream roller resting on the rails and allowing the longitudinal translational movement of the carriage and which are mounted the first one downstream and the second one upstream of the drive wheel in the first direction of travel and therewith constitute a triangle of which the drive wheel forms a top vertex;
and in which the two flexible belts are fixed only at each of their ends to the four corners of the surface that is to be covered and extend along the longitudinal edges of the surface that is to be covered, as follows:
they are placed in the opening in the rails in the lateral sections comprised between a fixing point and the roller closest to said fixing point, and
they sit over the drive wheel without slipping in the central section comprised between the two rollers.

It is preferable that, in such a mechanism, each flexible belt should sit over the downstream roller which lays it down in the opening in the corresponding rail and in which the engagement shoe is situated between said corresponding downstream roller and the corresponding deflection pulley.

The mechanism may additionally comprise a securing shoe slipped into each rail and situated between the corresponding deflection pulley and upstream roller, said securing shoe comprising:

an upper portion situated outside the rails and fixed to the translation mechanism in such a way as to move along the rails with the drum, and a lower portion, inserted in the opening (14) in the corresponding rail, said lower portion comprising a protruding step extending under the distal flange (6*b*) of the corresponding rail and preventing said securing shoe and therefore assisting the engagement shoe (50) in preventing said longitudinal-translation mechanism to which it is fixed from coming out of the opening in the corresponding rail.

The lower base of the engagement shoe preferably comprises a substantially planar portion the geometry of which is substantially that of a rectangular from which there has been removed a portion that defines a recess situated on the side adjacent to the surface that is to be covered and having a maximum width and a height that allow the bead to be accommodated, said recess extending longitudinally along the lower base from its upstream end where the recess has its maximum width and closes progressively before reaching its downstream end, said recess allowing the bead to be guided under the adjacent flange (6*a*) of the rail. The upstream portion of the lower base is advantageously chamfered to facilitate insertion of the bead in the recess of the engagement shoe.

In a preferred alternative form of embodiment, the rail is a C-section comprising, in addition to the adjacent flange a distal second flange separated from the surface that is to be covered by the opening and the adjacent flange and partially closing the opposite side of the opening closed by the adjacent flange and in which each engagement shoe comprises a protruding step extending under the distal flange or under the adjacent flange of the corresponding rail and preventing said engagement shoe and, therefore, said longitudinal-translation mechanism to which it is fixed, from coming out of the opening in the corresponding rail.

The deflection surface may be at least partially formed of an interior surface of a slot arranged in the upper portion of the engagement shoe:

said slot having a face opening extending over a surface parallel to the corresponding rail and facing towards the surface that is to be covered, said opening having a width less than the dimension of the bead located inside the slot and greater than the thickness of the cover which comes out of the slot via said opening, so that the cover can slide along the slot but the bead cannot leave the slot via the face opening, and said slot comprises a curved cross section allowing the bead of the cover to be brought tangentially toward the lower portion of the engagement shoe and thus under the adjacent flange of the corresponding rail.

The upper portion of the insertion shoe may then comprise a substantially cylindrical deflection pulley mounted with rotation about an axis parallel to the transverse direction of the cover, said deflection pulley having a distal end distant from the surface that is to be covered, and a proximal end adjacent to said surface, and in which the curved section is formed at least partially of the distal end and of the deflection pulley against which the corresponding bead of the cover which is partially wrapped around said deflection pulley rests in order to change orientation. The distal end of each deflection pulley situated on either side of the surface to be covered preferably bears against the corresponding bead thus applying a tensile stress to the cover in the transverse direction as it is unrolled, said stress being maintained as the cover is being locked into the rails. The device may additionally comprise a tensioning bearing mounted with the ability to rotate on each engagement shoe about a transverse axis of rotation preferably normal to the transverse edges of the cover and which guides the bead of the cover to the slot of the corresponding engagement shoe.

A device according to the present invention can be used to cover one of the following surfaces:
(a) a basin which may or may not be filled with a liquid, such as a pool, a water desalination, treatment or retaining basin;
(b) a sports ground, such as a tennis court or a cricket pitch;
(c) a vehicle bodyshell,
(d) a glazed surface such as a greenhouse, a conservatory or a vehicle window.

A surface is advantageously covered by a cover using a covering device as defined hereinabove, by employing the following method:
(a) the carriage is positioned at one end of the surface that is to be covered, with one transverse edge of the cover secured to this end of the surface and the rest of the cover being rolled up around the drum,
(b) the carriage is advanced in the first direction over the surface that is to be covered along the rails, and thus the cover is unrolled from the drum and deployed over the surface portion downstream of the drum while at the same time the bead of each longitudinal edge of the cover is guided and kept facing the opening of the corresponding rail as the drum gradually advances,
(c) using the engagement shoe, the bead is forced into the opening (14) in the rail and guided under the adjacent flange of said rail, where
(d) the bead is blocked therein by the immediately subsequent insertion into the same opening of the lateral section of belt directly adjacent to the downstream roller (33*av*) downstream in the direction of translation of the carriage.

BRIEF DESCRIPTION OF THE FIGURES

These aspects, together with other aspects of the invention, will be clarified in the detailed description of some particular embodiments of the invention, reference being made to the drawings of the figures in which.

DETAILED DESCRIPTION OF PARTICULAR EMBODIMENTS

Figure 1:
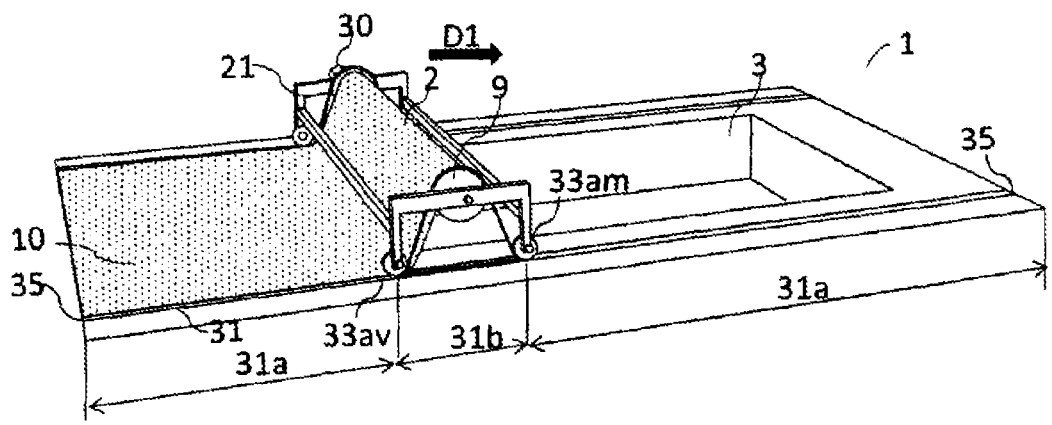
FIG. 1 is an overall perspective view of a surface with the drum in a position such that only part of the surface is covered by a cover.

As depicted in FIG. 1, the automatic device (1) for covering a surface (3) according to the invention comprises a cover (10) intended to cover said surface (3). The device (1) notably makes it possible to define surfaces defined by the outline of a water basin such as a swimming pool, water treatment basin, waste water purification plant, retention basin, desalination plant, etc. However, the invention may be implemented in any field that requires the covering of a surface, such as, for example, a clay-court or grass-court tennis court, a vehicle body, the glazed surface of a greenhouse, of a window of a vehicle such as a bus or train, or a conservatory etc. Thus, in general, what is meant in the present application by "surface" is any zone delineated by a perimeter.

The device (1) comprises a drum (2) which has a length at least equal to the width of the cover (10), the cover needed to be sufficiently wide and sufficiently long to cover the entire surface (3) that is to be protected, when it is deployed. The drum (2) is mounted on a longitudinal-translation mechanism comprising rails (6) placed on each side of said surface (3) and allowing the drum to be moved in a first direction (D1) of translation that allows the cover to be deployed and a second direction (D2) of translation that allows the cover to be removed. During the longitudinal translational movement of the drum (2) the latter has two directions of rotation: the first direction of rotation (during translational movement in the first direction) allowing it to unroll the cover (10) to deploy it and cover the surface that is to be protected (3), and the second direction of rotation (during translational movement in the second direction) allowing it to roll up the cover (10) so as to remove it and provide access to said surface (3).

The device (1) preferably also comprises a securing system situated at one transverse end of the surface that is to be covered and allowing the cover to be unrolled/rolled up over the surface that is to be covered (3) during the translation and rotational movement of the drum (2). Any known type of securing system that meets the stress and safety criteria dependent on the application can be used for that purpose. For example, the securing system may comprise a plurality of straps attached to the visible transverse end of the cover (10), said straps being, for example, fitted with anchoring hooks which can be fixed to the transverse part of the contour delimiting the surface that is to be covered (3). Alternatively, the end of the cover that is to be secured can be provided with eyelets which can be secured to the transverse edge of the surface using a series of anchors, screws, a cable or any other means. These anchorage means keep the visible transverse end of the cover (10) immobilized, allowing longitudinal tension to be generated therein and allowing it to be unrolled without the need to motorize the rotation of the drum (2) when it is moving in the first direction (D1) in order to cover the surface (3).

Figure 5:
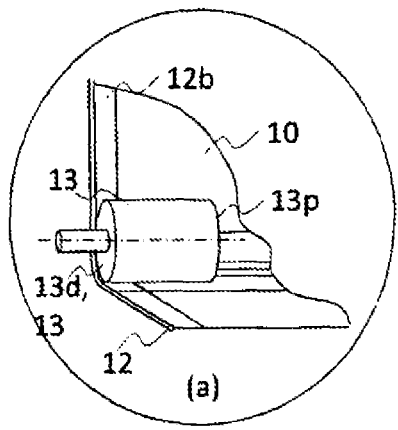
FIG. 5 illustrates a perspective cross section of the principle of operation of the engagement means according to a first embodiment of the present invention comprising a deflection pulley.
Figure 5:
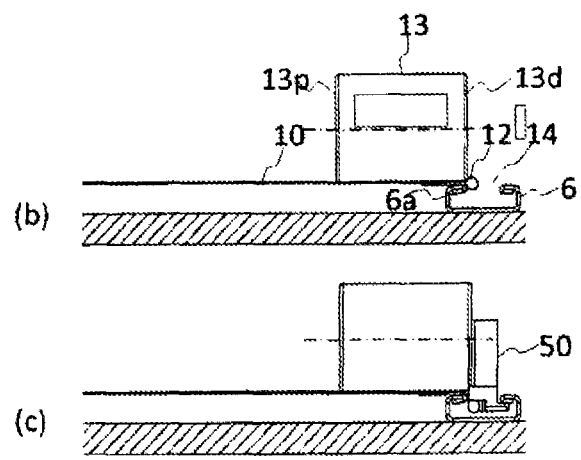
Figure 5:
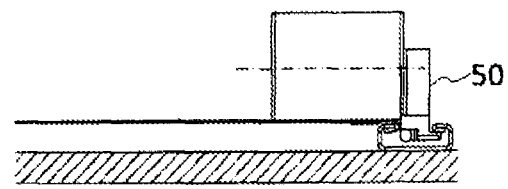
Figure 5:
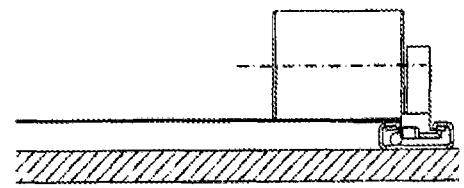

The rails (6) positioned on each side of said surface (3) are each made of a profile section having an opening (14) on one of its faces and facing away from the surface that is to be covered. The opening (14) is partially closed by at least an adjacent flange (6*a*) situated on the side adjacent to the surface that is to be covered. The device (1) that forms the subject of the invention comprises deflection surfaces (13) which may be formed by an interior surface of a slot (52) and/or a surface of a deflection pulley (13*w*) which are illustrated in FIGS. 8 to 14 and described in greater detail later on. The deflection surfaces (13) make it possible to change the orientation of the cover which presents at an angle between the drum and the surface that is to be covered, so as to orient it parallel to the surface that is to be covered and thus guide the bead toward the opening (14) of the corresponding rail (cf. FIGS. 5(*a*) and 6(*a*)).

Figure 2:
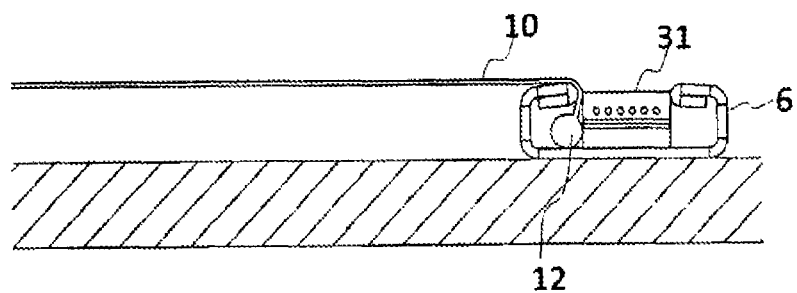
FIG. 2 is a cross section through a rail with the bead inserted under a flange of the rail and of the means for locking it in place (a) successfully secured and (b) inadequately secured.
Figure 2:

The system for continuously locking the bead (12) of the longitudinal edges of the cover (10) in the opening (14) in said rails (6) makes it possible, once the bead (12) has been engaged in the opening (14) to lock it by wedging it under the adjacent flange (6*a*) of the corresponding rail as the cover (10) is gradually unrolled (cf. FIGS. 2(*a*) and 4) and, when the drum is moved translationally in the second direction (D2), to release the bead allowing it to disengage as the cover is gradually rolled up. The engagement shoe (50) specially developed in the context of the present invention makes it possible to ensure that once the bead has been presented to the opening (14) in the corresponding rail, the bead is systematically guided into the opening and under the adjacent flange (6*a*).

Figure 3:
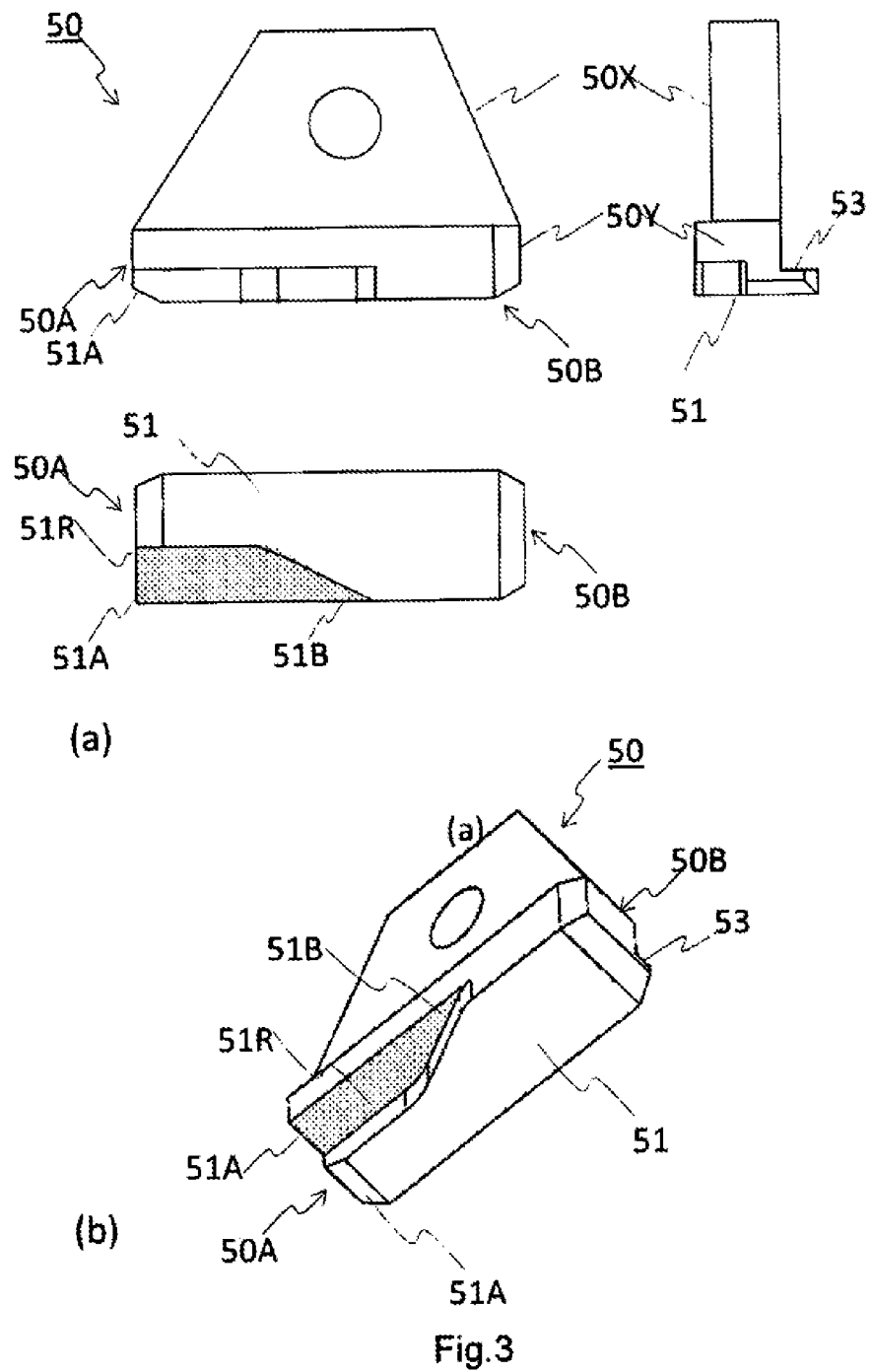
FIG. 3 shows a first example of an engagement shoe according to the present invention.
Figure 4:
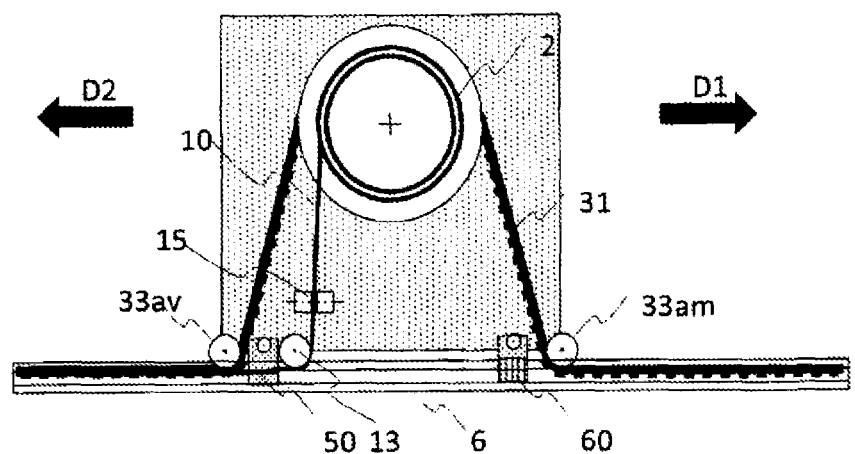
FIG. 4 shows a side view of a carriage comprising translation means and engagement and securing means according to the present invention.

An engagement shoe (50) is slipped into each rail, downstream of the deflection surfaces (13) in the first direction (D1) of translation movement as illustrated in FIG. 4. One example of an engagement shoe is illustrated in FIG. 3 and comprises:

(a) an upper portion (50X), situated outside of the rails and fixed to the translation mechanism so as to move along the rails with the drum, and (b) a lower portion (50Y), inserted in the opening (14) in the corresponding rail, comprising a lower base (51) the geometry of which is such that the bead is guided under the adjacent flange (6*a*) of the corresponding rail.

Figure 7:
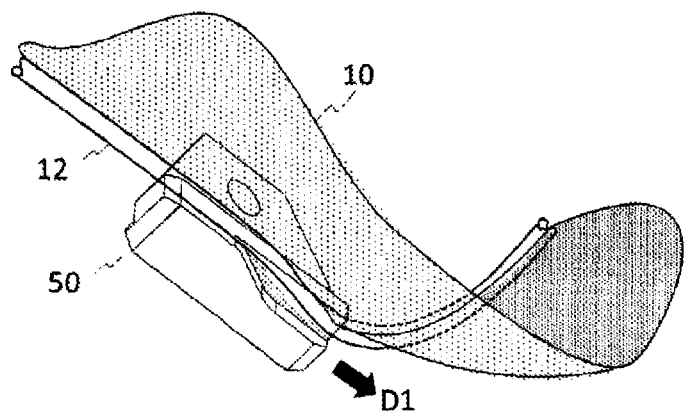
FIG. 7 illustrates the guiding of a bead of a cover by the lower portion of an engagement shoe according to the present invention.
Figure 15:
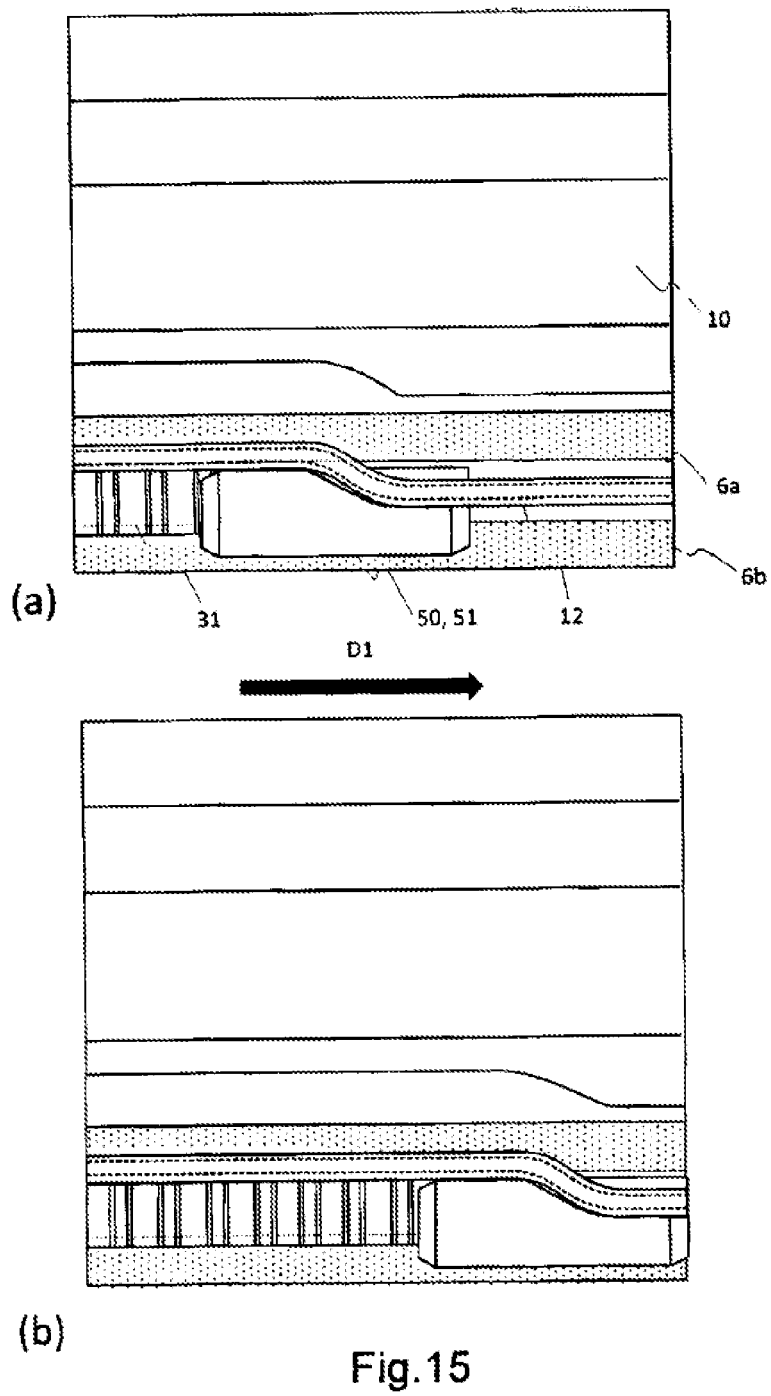
FIG. 15 illustrates a view from underneath of the principle of operation of the engagement means according to the present invention.

As illustrated in FIG. 3, the lower base (51) of the engagement shoe (50) preferably comprises a substantially planar portion the geometry of which is substantially that of a rectangular from which there has been removed a portion defining a recess (51R) situated on the side adjacent to the surface that is to be covered and having a maximum width and a height that allow the beads to be accommodated. The recess (51R) extends longitudinally along the lower base, from its upstream end (51A) where the recess has its maximum width and closes up progressively before reaching its downstream end (51B) (the terms "upstream" and "downstream" being used here with respect to the first direction (D1) of travel of the drum). FIG. 7 shows the path imposed on a cover bead by the recess (51R) of an engagement shoe (50), and FIG. 15 shows the lower base (51) of such a shoe, inserted in a rail (6) (shaded zone) moving in the first direction (D1) of translational movement. As can be seen in FIGS. 5(c)&(d), 6(c)&(d) and 15, the bead (12) presented to face the opening (14) in the rail is introduced into said recess which guides it under the adjacent flange (6a) of the rail. Thanks to said recess (51R), the bead has no other option but to position itself correctly under the adjacent flange (6a) of the rail, thus allowing the locking system (31) to position itself appropriately, as depicted in FIG. 2(a) and thus firmly lock the bead (12), and therefore the deployed cover portion, in the rail (6). In order to make it easier for the bead to be inserted in the recess (51R) of the engagement shoe (50), the upstream portion (51A) of the lower base (51) is preferably chamfered, as illustrated in FIG. 3(a) (profile view).

The locking system comprises a means of partially closing the opening (14) in the rail in its portion corresponding to the deployed portion of the cover leaving only a residual opening. The partial closure needs to be such that, on the one hand, it allows the thickness of the cover to pass through the residual opening and, on the other hand, it does not allow the thickness of the bead to pass through the residual opening and thus allows the bead to be locked under the adjacent flange (6a) inside the rail (6). Such a means of partial closure preferably takes the form of a flexible belt (31) of a width slightly smaller than the span of the opening (14) and which is inserted into the opening in the rail as the bead (12) is gradually guided under the adjacent flange (6a). Thus, as the drum moves translationally in the first direction (D1), the belt (31) gradually as the cover (10) is unrolled lays itself down in the opening (14) in the corresponding rail once the bead (12) has been engaged under the adjacent flange (6a) thereof, thus wedging it therein, and during the translational movement of the drum in the second direction, the belt (31) is removed from said opening (14), thus releasing the bead and allowing it to disengage gradually as the cover is rolled up.

Once the bead is locked under the adjacent flange (6a), the longitudinal edge of the cover (10) is held firmly even in the event of very high mechanical stress loadings on the cover (10) due for example to a depression or to gravitation. In the case of swimming pools, it confers safety in the event of (authorized or unauthorized) access onto the cover. The strength of the locking system may easily achieve a range from 5 to 10 kN/m (500 to 1000 kg/m), which is sufficient for many applications. Depending on the materials used, greater locking strengths may be achieved.

Figure 6:
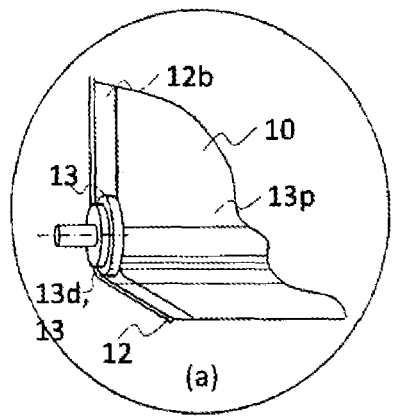
FIG. 6 illustrates a perspective cross section of the principle of operation of the engagement means according to a second embodiment of the present invention comprising a deflection pulley that is more compact than in the first example of FIG. 5.
Figure 6:
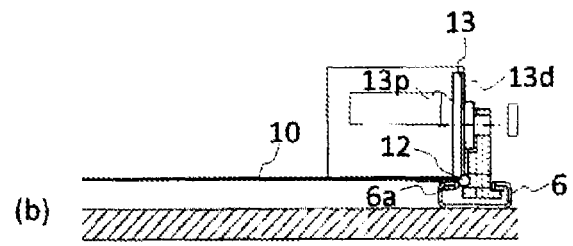
Figure 6:
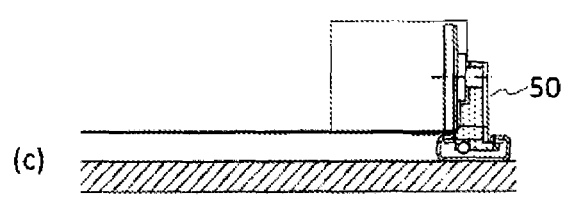
Figure 6:
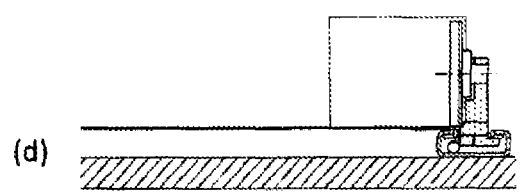

In order for the bead to present to the recess (51R) of the engagement shoe correctly, it is preferable to provide bead guiding means. A first guide means is afforded by deflection surfaces (13) which may be formed by an interior surface of a slot and/or a bearing surface of a deflection pulley (13w). The deflection surface may be comprised on the upper portion (50X) of the engagement shoe, or may be separate therefrom. In a preferred alternative form, the deflection surface (13) is an integral part of the upper portion of the engagement shoe. This then yields a highly compact assembly comprising fewer mechanical parts. The deflection surfaces allow said bead (12) of each edge of the cover to be guided and positioned toward the lower portion (50Y) of the engagement shoe, facing the opening (14) in the corresponding rail (6) during the translational movement in the first direction (D1) of the drum, causing the unrolling of the cover (cf. FIGS. 5&6).

Figure 8:
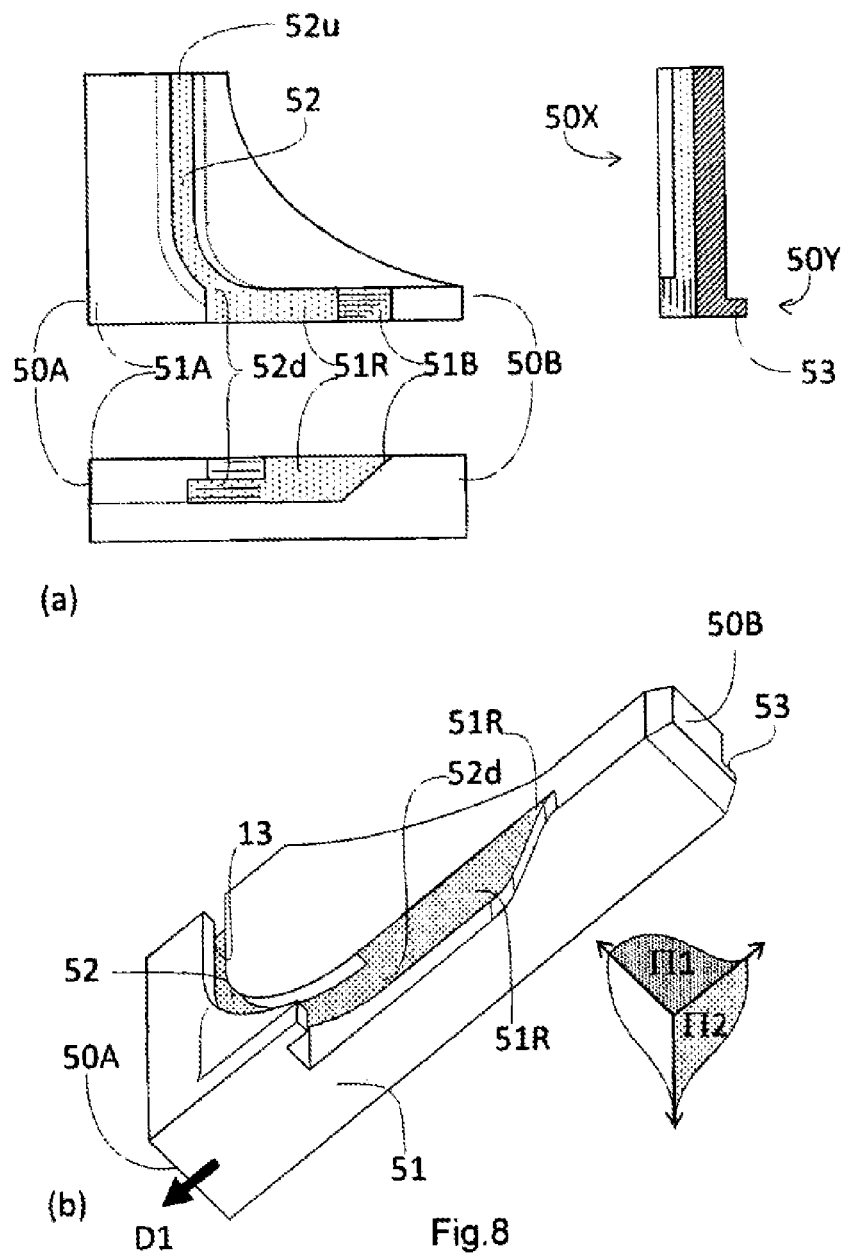
FIG. 8 shows one example of an engagement shoe according to the present invention.

As illustrated in FIG. 8, the deflection surface (13) may be at least partially formed by an interior surface of a slot (52) arranged in the upper portion (50X) of the engagement shoe (50), such that said slot has a face opening extending over a surface parallel to the corresponding rail (6) and facing towards the surface that is to be covered, said opening has a width less than the dimension of the bead (12) located inside the slot and greater than the thickness of the cover (10) which comes out of the slot via said opening, so that the cover can slide along the slot but the bead cannot leave the slot via the face opening, and said slot comprises a curved cross section allowing the bead of the cover (10) to be brought tangentially toward the lower portion (50Y) of the engagement shoe and thus under the adjacent flange (6a) of the corresponding rail.

Figure 9:
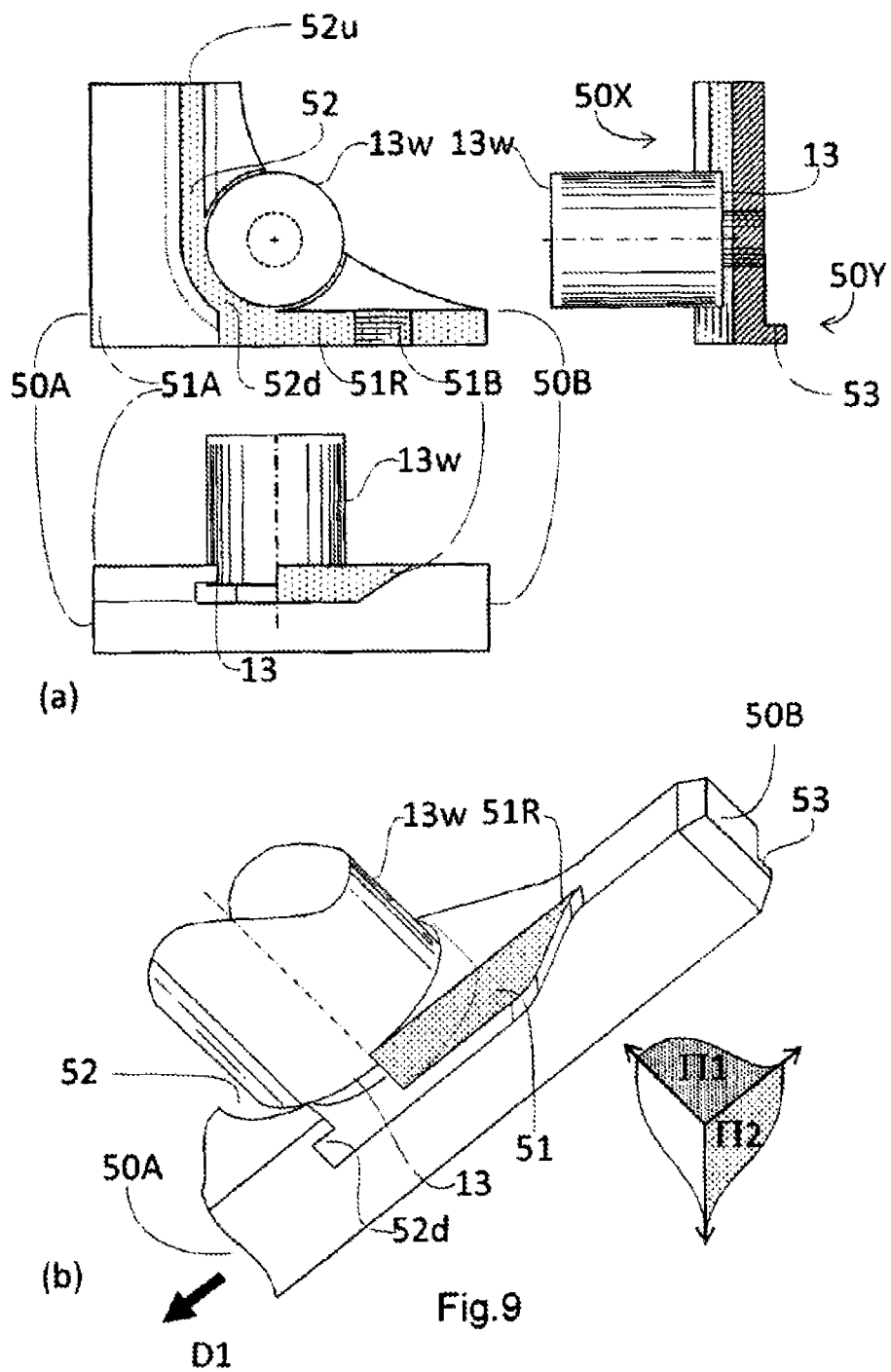
FIG. 9 shows another example of an engagement shoe according to the present invention.
Figure 10:
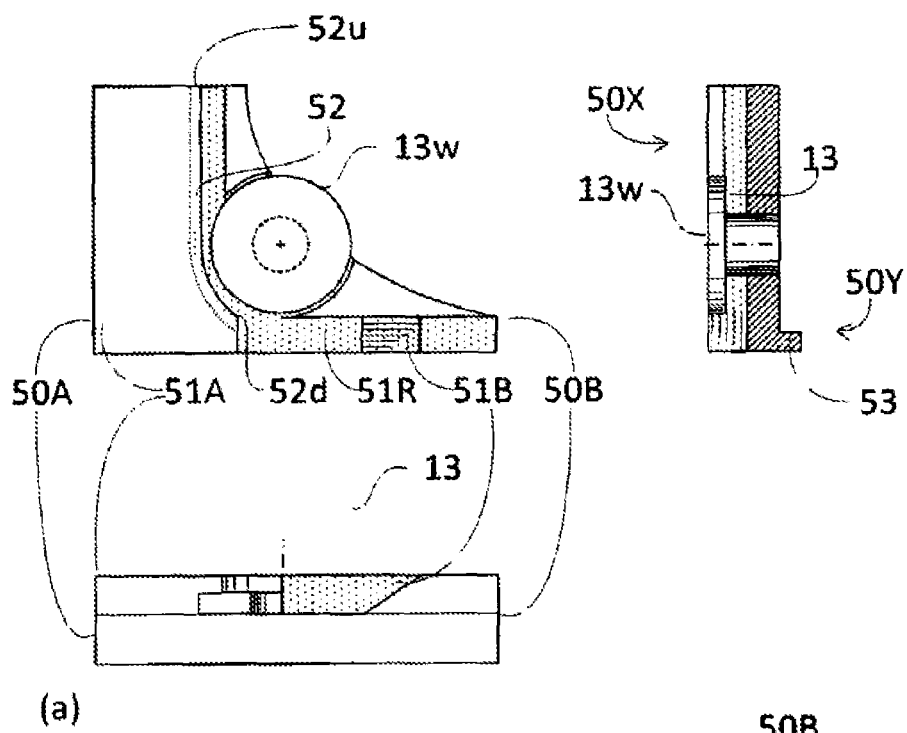
FIG. 10 shows another example of an engagement shoe according to the present invention.
Figure 10:
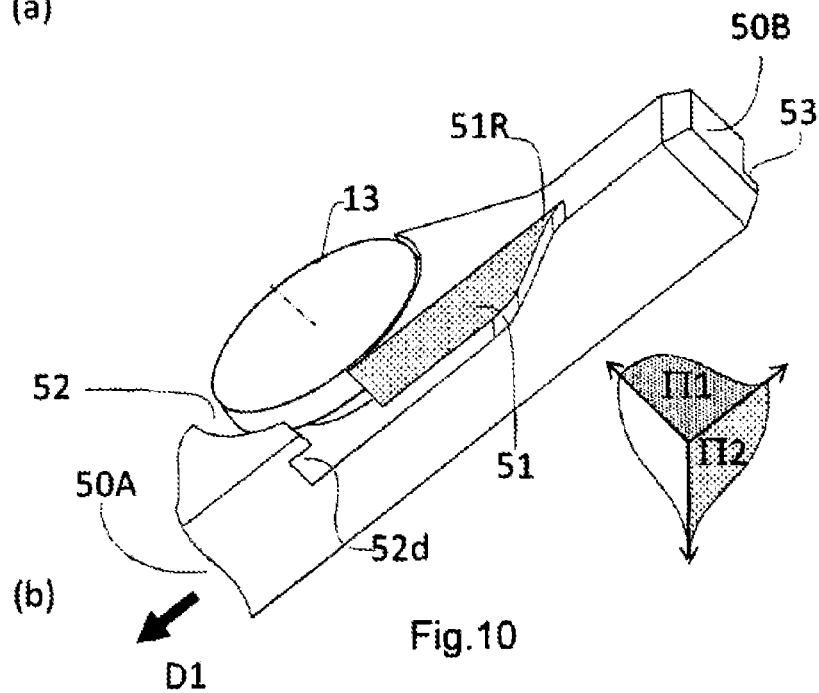
Figure 12:
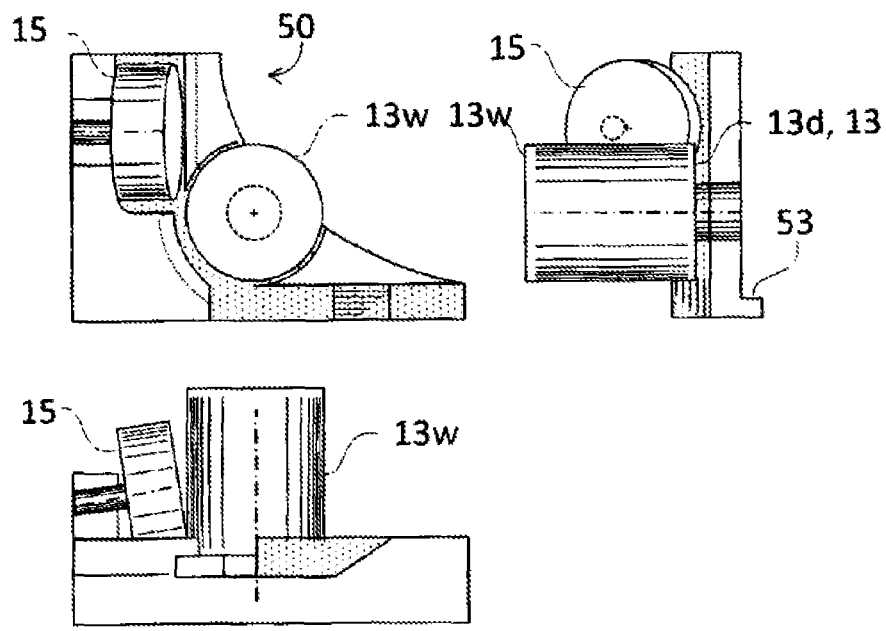
FIG. 12 shows another example of an engagement shoe according to the present invention.
Figure 13:
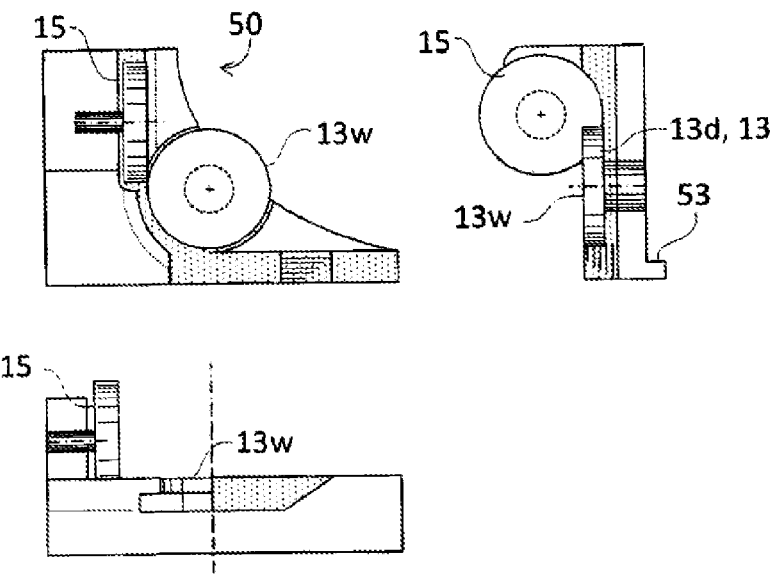
FIG. 13 shows another example of an engagement shoe according to the present invention.
Figure 14:
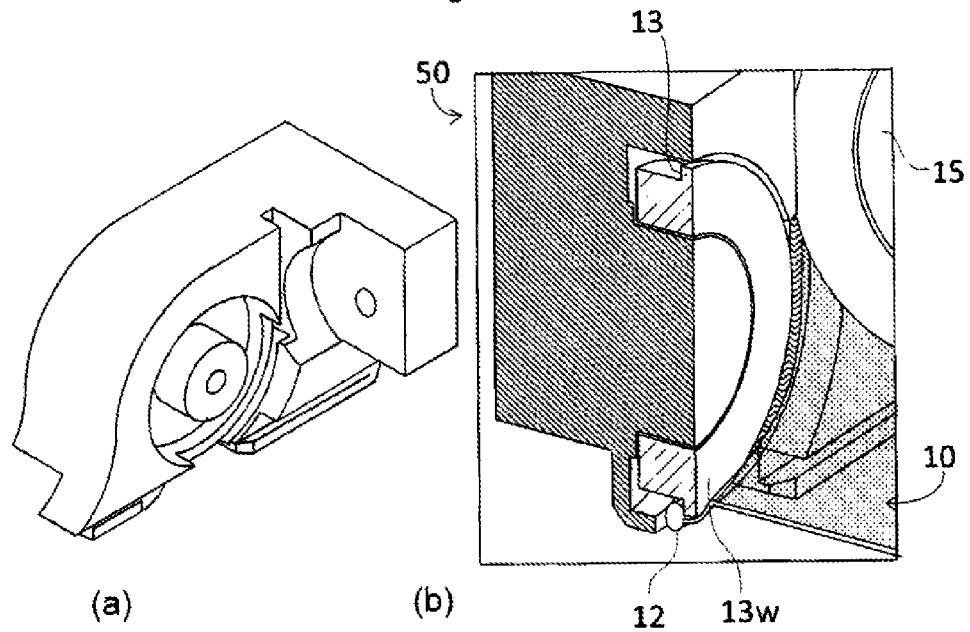
FIG. 14 shows (a) a shoe according to the example of FIG. 13 with neither a pulley nor a bearing and (b) a cross section through the deflection pulley and tensioning bearing mounted on the shoe of (a).

In a preferred alternative form of embodiment, the upper portion of the insertion shoe comprises a substantially cylindrical deflection pulley (13w) mounted to rotate about an axis parallel to the transverse direction of the cover (cf. FIGS. 5(a), 6(a), 9, 10 and 12 to 14). This deflection pulley comprises a distal end (13d) distant from the surface that is to be covered, and a proximal end (13p) adjacent to said surface to be covered. The curved section of the deflection surface described hereinabove is then formed at least in part by the distal end (13d) of the deflection pulley against which the corresponding bead of the cover rests and is partially wrapped around said deflection pulley in order to change orientation. Several arrangements of an engagement shoe comprising a deflection pulley are depicted in FIGS. 9, 10, 12 to 14. In FIGS. 9 and 12, a deflection pulley (13w) in the form of an elongate cylinder is depicted. An elongate pulley makes it easier to effect the direction change of the cover. However, narrower and less invasive deflection pulleys like those depicted in FIGS. 10, 13 and 14 are also effective, especially if the cover is subjected to transverse tension at the time of locking, as discussed hereinbelow. The important thing is the distal end (13d) of the pulley (13w) offers a deflection surface (13) against which the bead can bear and be held. FIG. 14(b) illustrates how the bead is wedged by a deflection pulley (13w) which allows the thickness of the cover, but not the bead, to pass.

In a preferred embodiment, the cover is subjected to transverse tension as it is deployed, in order to guarantee a smooth, stable and appealing appearance. In order to insert the beads (12) into the openings in the rails (6) by applying such a transverse tension to the cover, this cover is wrapped around each deflection surface (13) in such a way that the bead (12) bears against an interior surface of a slot or against the surface of the distal end (13d) of a deflection pulley (13w). In order to ensure such positioning of the beads (12) with respect to the deflection surfaces (13), the system may comprise tensioning bearings (15) mounted to rotate about an axis of rotation that is transverse, preferably normal, to the transverse edges of the cover and which guide the beads of the cover toward the deflection surfaces (13) of the corresponding engagement shoe. Each tensioning bearing (15) may advantageously be positioned between the deflection surface (13) of the corresponding engagement shoe and the drum, so as to bring and position the bead of the cover against the deflection surface (13). For preference, a tensioning bearing is mounted directly on each engagement shoe (50).

Figure 11:
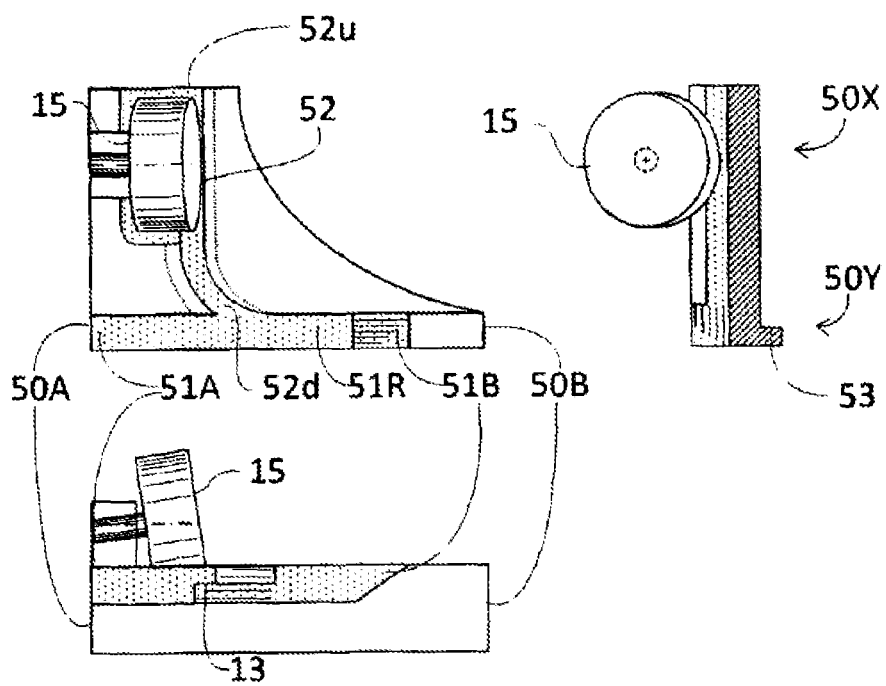
FIG. 11 shows another example of an engagement shoe according to the present invention.

The engagement shoe of FIG. 11 comprises a tensioning bearing (15) mounted to rotate on an axis which is transverse but not normal to the transverse edges of the cover and is able to apply a transverse tension to the cover and to guide a bead thereof into the slot (13) in the shoe an internal surface of which forms the deflection surface. From the moment at which a bead of the cover comes into contact with the tensioning roller until the point at which it is engaged and locked in the rail, the cover is kept under transverse tension, giving that part of the cover that has already been deployed downstream of the drum a smooth appearance.

FIG. 12 shows an engagement shoe similar to that of FIG. 11 described above, comprising a tensioning bearing (15) and of which the curved part of the slot is formed by a deflection pulley (13w) mounted to rotate on an axis parallel to the transverse edges of the cover. FIGS. 13 and 14 illustrate another example of an engagement shoe comprising a slot, a deflection pulley (13w) and a tensioning bearing (15) mounted on an axis normal to the axis of the deflection pulley. FIG. 14(a) shows an example of a shoe, with neither pulley nor bearing, which is highly compact and advantageous. FIG. 14(b) shows a cross section of a shoe according to FIG. 14(a) showing a deflection pulley (13w) comprising a lip of which one or more internal faces form the deflection surface (13). Whereas in FIGS. 11 and 12 the tensioning bearing is mounted to rotate on an axis that is transverse, but not normal to the transverse edges of the cover, in the example of FIG. 14, the axis of rotation of the tensioning bearing (15) is normal to the axis of the deflecting pulley (13w) and to the transverse edges of the cover. The tensioning bearings (15) guides the corresponding beads toward the deflection surfaces applying, if necessary, a transverse tension to the cover. The deflection surfaces (13) guide the corresponding beads toward the lower portion (50Y) of the engagement shoes, the geometry of which guides the beads under the adjacent flange (6a) as illustrated in FIGS. 7 and 15. That avoids the danger illustrated in FIG. 2(b) that the bead will be incorrectly or not introduced under the adjacent flange (6a) of a rail.

In some cases, it is not desirable to apply a transverse tension to the cover. For example, in the case of floating covers covering a swimming pool, no transverse tension is applied to the cover. Likewise, in cases in which the cover has a window or opening, where material is absent, no transverse tension could be applied to this portion of the cover. In such cases, all that is required is not to use tensioning bearings (15) or else to position them at a distance less than or equal to the width of the cover. Even if no transverse tension needs to be applied to the cover, the deflection surfaces remain essential to the guiding of the two beads toward the inside of the rail. They simply need to be separated from one another by a distance greater than the width of the cover in order for them not to apply transverse tension to the cover other than its own self-weight.

In a particularly preferred alternative form of the present invention, aside from performing their function of continuously locking the bead (12), the belts (31) also contribute to the translational movement of the drum (2) which is preferably mounted to rotate on a carriage (21) mounted on the rails (6) and transversely overhanging the surface (3) that is to be covered. In such an alternative form as depicted in FIGS. 1 and 3, said carriage comprises at each of its ends:
(a) a drive wheel (9) the axis of rotation of which is parallel to that of said drum (2);
(b) at least a first downstream roller (33av) and at least a second upstream roller (33am) resting on the rails (6) and allowing the longitudinal translational movement of the carriage (21) and which are mounted the first one downstream and the second one upstream of the drive wheel (9) in the first direction (D1) of travel and therewith constitute a triangle of which the drive wheel (9) forms the top vertex (or vertex most distant from the surface that is to be covered).

Each of the two flexible belts (31) is secured only at each of its ends (35) to the four corners of the surface that is to be covered and extends along each of the longitudinal edges of the surface that is to be covered, as follows:
(c) each belt (31) fits without slipping over the drive wheel (9) in the central section (31b) comprised between the two rollers (33av, 33am), and
(d) each belt is arranged in the opening (14) of the rails (6) in the lateral sections (31a) comprised between a securing point (35) and the roller (33av, 33am) closest to said securing point.

In order to avoid any slippage between the belts (31) and the drive wheels (9), the surface of each belt that comes into contact with the drive wheel preferably comprises teeth which engage in corresponding teeth on the drive wheel. Alternatively, the belts may take the form of chains, or have a rough face making it possible to avoid any slippage against the drive wheel (9). Translation and locking systems of the type introduced hereinabove are described for example in WO2010010152, WO2010054960 and Belgian patent application BE2012/0725.

In the lateral section (31a) downstream of the carriage in the first direction (D1) of translation (i.e. defined between a securing point (35) and the downstream roller (33av) of the carriage), the belt (35) also acts as a bead locking system, as discussed above. The engagement shoe (50) is then situated between said corresponding downstream roller (33av) and the corresponding deflection pulley (13) as depicted in FIG. 4.

Although a G-section for the rails (6), comprising a flange on just one side of the opening (14), is enough to allow locking of the bead (12) according to the present invention, a C-section is preferred, comprising, in addition to the adjacent flange (6a) a distal second flange (6b), separated from the surface that is to be covered by the opening (14) and the adjacent flange (6a) and partially closing the opposite side of the opening (14) left by the adjacent flange (6a). Such a profile allows the translation mechanism to be secured more firmly to the rails by making provision for each engagement shoe (50) to comprise a projecting step (53) extending under the distal flange (6b) of the corresponding rail. This step prevents said engagement shoe (50), and therefore said longitudinal translation mechanism to which it is attached, from coming out of the opening in the corresponding rail. The step (53) can also be slipped under the adjacent flange (6a) but the shoe will be more stable if the step is slipped under the distal flange, because the cover subjects the upper portion (50X) of the shoes to forces oriented toward the surface that is to be covered and have a tendency to cause the shoes to pivot toward the cover.

The step (53) and its connection to the shoe are subjected to high stresses in use. They are subjected on the one hand to high friction forces against the flanges of the rail during the translational movement. In order to reduce friction during translational movement of the shoe along the corresponding rail, it is preferable for those parts of the pad and of the step that are in contact with a surface of the rail to be made from a material that has a low coefficient of friction. For example, a polymer may be used, such as polyethylene (PE), polypropylene (PP), polyamide (PA), polyoxymethylene (POM), a fluorinated polymer such as polytetrafluoroethylene (Teflon®, PTFE) or the like.

Furthermore, the step is subjected to high bending stresses caused in particular by the tension applied to the cover as the corresponding bead of the cover is engaged. It has been found that, in some cases, particularly for large-sized covers overhanging a cavity, the tensions in the cover are such that steps of certain shoes made of polymers as described above have been found to break.

Figure 16:
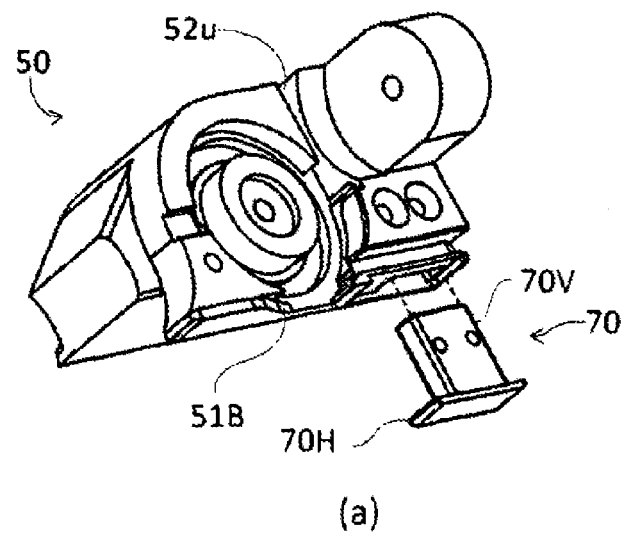
FIG. 16 illustrates a preferred alternative form of the invention in which the engagement shoe comprises a reinforcing insert to reinforce the lower portion and, in particular, the step of the engagement shoe.
Figure 16:
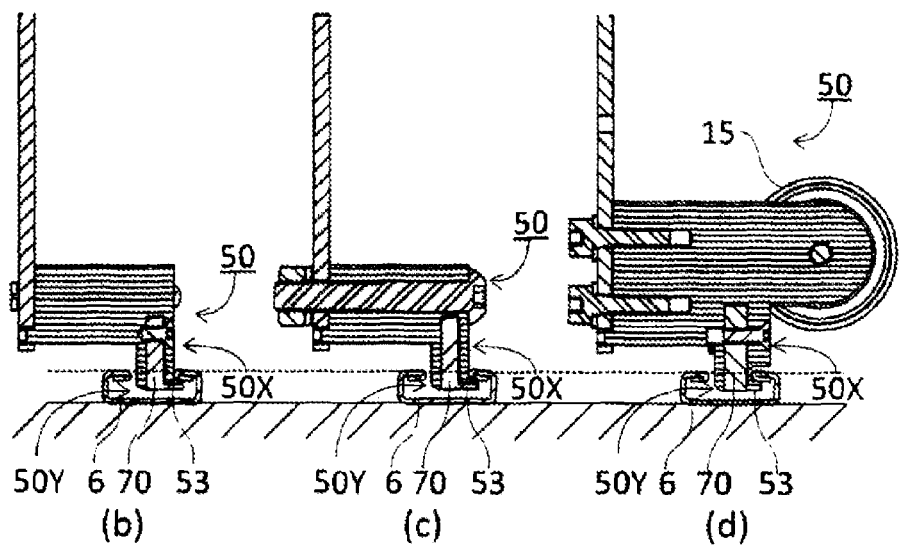

In order to reduce friction during the translational movement of a shoe along a rail, while at the same time ensuring the long term integrity of the shoe, in a preferred alternative form of embodiment of the present invention, the engagement shoe comprises a polymer structure and a reinforcing insert (70) made of a metal or of a fiber reinforced composite, in order to locally strengthen the engagement shoe. In particular, as depicted in FIG. 16, the reinforcing insert may be in the shape of an L (or of an inverted T), with a horizontal first portion (70H) reinforcing the step (53) and a vertical portion (70V), normal to the horizontal portion and extending from the lower portion (50Y) to the upper portion (50X) of the engagement shoe. For that purpose, the polymer structure may comprise on the one hand a cavity into which the vertical portion of the reinforcing insert is inserted and, on the other hand, a depression in a lower part of the step, so that all the surfaces of the engagement shoe that are in contact with a rail are made of polymer. The reinforcing insert may be made of steel, preferably stainless steel, or of aluminum or aluminum alloy. Alternatively, the insert may be made from a fiber-reinforced composite with long or continuous fibers and a matrix, preferably an organic matrix, such as thermoset resins, such as epoxy, polyester, etc. or thermoplastic polymers such as polyamide, polyester, polyurethane, etc.

FIG. 16 illustrates various examples of engagement shoes comprising a reinforcing insert (70). FIG. 16(a) depicts a perspective view showing the insertion of a reinforcing insert (70) in a cavity provided in the polymer structure of the engagement shoe. As can be seen in the cross sections of FIGS. 16(b)&(d), the reinforcing insert (70) can be held in position in the cavity by any securing means known to the person skilled in the art, such as screws, snap-fastening means or the like. A reinforcing insert may be used for any alternative embodiment of engagement shoe, from the simplest as illustrated in FIGS. 16(b)&(c), to the more sophisticated as depicted in FIG. 16(d) which comprises a tensioning bearing (15). In the alternative form of FIG. 16(c), the engagement shoe comprises a second reinforcing insert strengthening the upper portion (50X) of the engagement shoe.

As illustrated in FIG. 4, in order to secure the carriage (21) to the rails more firmly still, the device preferably comprises a fixing shoe (60) slipped into each rail downstream of the upstream roller (33am) and upstream of the engagement shoe (50) in the first direction (D1) of translation. Such a securing shoe (60) is similar to the engagement shoe (50) but does not have a recess (51R) which it does not need because the securing shoe (60) does not at any time come into contact either with the cover (10) or with the bead (12). The securing shoe therefore comprises:

(a) an upper portion situated outside the rails and fixed to the translation mechanism in such a way as to move along the rails with the drum, and (b) a lower portion, inserted in the opening (14) in the corresponding rail, said lower portion comprising a protruding step extending under the distal flange (6b) of the corresponding rail and preventing said securing shoe (60) and therefore said longitudinal-translation mechanism to which it is fixed from coming out of the opening in the corresponding rail, thus assisting the engagement shoe (50) in this task.

A device according to the present invention preferably allows the following operations illustrated in FIG. 4:

(a) as the cover is unrolled (=cover is deployed), the bead (12) of each longitudinal edge of the cover is guided and held in relation to the opening (14) in the corresponding rail (6) as the carriage gradually advances in the first direction (D1), thanks to the action of the deflection surfaces (13) and optionally tensioning bearings (15);

(b) the bead therefore interacts with the engagement shoe (50) which forces it into the opening (14) in the rail and, with the aid of the recess (51R), guides it under the adjacent flange (6a) of said rail, where (c) the bead is blocked by the immediately subsequent insertion into the same opening of the lateral section (31a) of belt directly adjacent to the downstream roller (33av) downstream of the first direction (D1) of translational movement of the carriage, and (d) when the cover is being rolled back up (=cover is being removed), the central section of belt (31b) directly adjacent to the downstream roller (33av) upstream of the direction of translational movement of the carriage in the second direction (D2) is removed from said opening (14) in the rail, thus allowing the bead (12) to disengage from the rail and making it possible for the cover to be rolled back up onto the drum (2) of the carriage.

Movement of the drum along a surface that is to be covered or uncovered generally occurs at a substantially constant speed. The drive wheels (9) therefore need to rotate at a substantially constant rotational speed. However, particularly for surfaces of great longitudinal dimensions, the outside diameters of the drum as the cover is being deployed or removed can vary considerably. Because the speed at which the cover is deployed/removed is dependent on the rotational speed of the drive wheels (which generally remains constant) and because the outside diameter of the drum varies with the amount of cover rolled up on it, it then follows that the drum and the drive wheels (9) cannot rotate at the same speed throughout the translational movement of the drum. For small sized covers, it is sometimes possible to compensate for the differences in speed by pulling on the cover. For covers with greater longitudinal dimensions, such as for a swimming pool or a semitrailer, it is necessary to provide means for modifying the relative speeds of rotation of the cover rolling/unrolling drum and the axis of rotation of the drive wheels (9). These means may include a spiral-wound spring placed inside the drum (2) to make it possible to compensate for the difference between the rotational speed of the drive wheels, which has to remain substantially constant, and the rotational speed of the drum, which varies with the outside diameter of the drum as the cover is gradually unrolled/rolled up. When the cover is being deployed, the drum rotates spontaneously as a result of the tension created by the cover which is fixed to one transverse edge of the surface that is to be covered. If the spiral-wound spring becomes tensioned while the cover (10) is being deployed over the surface, there is no need to motorize the rotation of the drum during the retrieval and re-rolling of the cover around the drum either, as the rotation of said drum is brought about by the relaxation of the spiral-wound spring. This system is highly advantageous because it does not require a second motor or a gearing system or any electronic control system in order to rotate the drum at the appropriate speed.

Longitudinal tension can be applied to the cover as it is being deployed simply by ensuring that the speed at which the cover is unrolled by the rotation of the drum is lower than the speed of longitudinal translational movement of the drum, either by using a brake or a spring in the drum rotation system as described above, or by differentiated motorized control of the rotational and translational movements of the drum. If these two speeds are synchronous, the cover will be deployed with no tension other than the tension generated by its own self-weight in the case of a cover covering a surface comprising a cavity such as a swimming pool.

The cover can be made of any material suited to the application in question: synthetic or natural textile materials, polymer films, slats made of polymer, metal or wood, etc. It may be transparent, opaque or translucent and may form a barrier against fluids or on the other hand may be porous, or may even comprise mesh openings such as those of a net. For example, for applications to swimming pools or water treatment basins or the like, it is advantageous for the cover to comprise drainage holes thus allowing rainwater not to accumulate on the cover and thus avoiding the formation of pockets of water on the surface of the cover.

A covering system according to the present invention is particularly suited to covering surfaces such as:
(a) a basin which may or may not be filled with a liquid, such as a pool, a water desalination, treatment or retaining basin;
(b) a sports ground, such as a tennis court or a cricket pitch;
(c) a vehicle, such as a trailer
(d) a glazed surface such as a greenhouse, a conservatory or a vehicle window.

By virtue of the engagement shoe (50) of the present invention, the bead (12) provided along the longitudinal edges of a cover (10) is systematically suitably positioned under the adjacent flange (6a) of the rail into which it is to be locked, as illustrated in FIG. 2(a) and a situation such as that depicted in FIG. 2(b) is avoided, even when there is no lateral tension on the cover as it is being inserted into the rail. The safety of the device is thus guaranteed even after numerous cycles of deploying and removing the cover over a surface that is to be covered.

The invention claimed is:
1. A device (1) for covering a surface (3) comprising:
(a) a substantially rectangular cover (10) having two longitudinal edges opposite one another and two transverse edges opposite one another, each longitudinal edge being equipped with a projecting bead (12) extending along said edge,
(b) a drum (2) mounted on a mechanism for longitudinal translation along rails (6) placed one on each side of said surface (3), each rail (6) made up of a profile section having an opening (14) on a face thereof, said face comprising at least an adjacent flange (6a) situated on a side of each rail that is adjacent to the surface that is to be covered and partially closing said opening (14), said translation mechanism allowing rotation of and longitudinal translation of the drum in a first direction that causes the cover to be unrolled and deployed over the surface that is to be covered (3) and in a second direction that causes the cover to be rolled up and removed from said surface (3),
(c) a deflection surface (13) provided on each side of the surface that is to be covered so as to guide and position said bead (12) of each edge of the cover to face the opening (14) in the corresponding rail (6) as the drum effects the translational movement in the first direction causing the cover to unroll,
(d) a locking system for continuously locking the bead (12) of each longitudinal edge of the cover (10) in the opening (14) in the corresponding rail (6), said system configured to urge each bead (12) into the opening (14) of the corresponding rail (6) and wedge each bead (12) under the adjacent flange (6a) of the corresponding rail as the cover (10) is gradually unrolled and, as the drum effects the translational movement in the second direction, to release each bead to disengage from the adjacent flange (6a) of the corresponding rail as the cover is gradually rolled up,
characterized in that the device additionally comprises a bead engagement shoe (50) slipped into each rail downstream of the deflection surfaces (13) in the first direction of translation, said engagement shoe comprising:
(e) an upper portion (50X), situated outside of the rails and fixed to the mechanism for longitudinal translation so as to move along the rails with the drum, and
(f) a lower portion (50Y), inserted in the opening (14) in the corresponding rail, the lower portion (50Y) comprising a lower base (51) having a planar portion that defines a recess (51R) that extends longitudinally along the lower base (51), the recess (51R) being widest near an upstream end of the lower base (51) and progressively narrowing toward a downstream end of the lower base (51), the recess of each engagement shoe (50) configured to guide each bead under the adjacent flange (6a) of the corresponding rail (6).

2. The device as claimed in claim 1, in which the upstream end (51A) of the lower base (51) is chamfered to facilitate insertion of the bead (12) in the recess (51R) of the engagement shoe (50).

3. A method of using a device as claimed in claim 1 for covering a surface (3) selected from the group consisting of:
(a) a basin which may or may not be filled with a liquid, including a pool, a water desalination, treatment and retaining basin;
(b) a sports ground, including a tennis court and a cricket pitch;
(c) a vehicle bodyshell, and
(d) a glazed surface.

4. The device as claimed in claim 1, comprising a securing shoe (60) slipped into each rail and situated between the corresponding deflection pulley (13) and second roller (33am), said securing shoe comprising:
an upper portion situated outside the rails and fixed to the mechanism for longitudinal translation in such a way as to move along the rails with the drum, and
a lower portion, inserted in the opening (14) in the corresponding rail, said lower portion comprising a protruding step extending under the distal flange (6b) of the corresponding rail and preventing said securing shoe (60) and therefore assisting the engagement shoe (50) in preventing said mechanism for longitudinal translation to which it is fixed from coming out of the opening in the corresponding rail.

5. The device as claimed in claim 1, in which the locking system additionally comprises two flexible belts (31), each one configured to
during the translational movement of the drum in the first direction, be laid down in the opening (14) in the corresponding rail as the cover (10) is gradually unrolled, and after each bead (12) has been engaged under the adjacent flange (6a) of the corresponding rail, and
during the translational movement of the drum in the second direction, be removed from said opening (14), thus releasing the bead and allowing the bead to disengage with the adjacent flange (6a) of the corresponding rail as the cover is gradually rolled up.

6. The device as claimed in claim 5, in which the mechanism for longitudinal translation comprises a carriage (21) mounted on the rails (6) and transversely overhanging the surface (3) that is to be covered and supporting the drum (2), the carriage (21) having a first end and a second end, each end of the carriage comprising:
   a drive wheel (9) having an axis of rotation that is parallel to an axis of rotation of said drum (2);
   a first roller (33*av*) and a second roller (33*am*) rotatably attached to the carriage (21) and resting on the rails (6) and allowing the longitudinal translational movement of the carriage (21), the first roller (33*av*) attached to the carriage (21) downstream of the drive wheel (9) and the second roller (33*am*) attached to the carriage (21) upstream of the drive wheel (9) in the first direction of travel;
and in which the two flexible belts (31) are fixed only at each of their ends (35) to corners of the surface that is to be covered such that each belt (31) extends along each of the longitudinal edges of the surface that is to be covered, as follows and wherein:
   lateral sections (31*a*) of each of the flexible belts (31) are placed in the opening (14) of the corresponding rail (6, and
   a central section (31*b*) of each of the flexible belts (31) sits over the drive wheel (9) between the two rollers (33*av*, 33*am*).

7. The device as claimed in claim 6, in which each flexible belt (31) sits under the first roller (33*av*) which lays each flexible belt (31) down in the opening in the corresponding rail (6) and in which the engagement shoe (50) is situated between said corresponding first roller (33*av*) and a corresponding deflection pulley (13).

8. The device as claimed in claim 7, comprising a securing shoe (60) slipped into each rail and situated between the corresponding deflection pulley (13) and second roller (33*am*), said securing shoe comprising:
   an upper portion situated outside the rails and fixed to the mechanism for longitudinal translation in such a way as to move along the rails with the drum, and
   a lower portion, inserted in the opening (14) in the corresponding rail, said lower portion comprising a protruding step extending under a distal flange (6b) of the corresponding rail and preventing said securing shoe (60) and therefore assisting the engagement shoe (50) in preventing said mechanism for longitudinal translation to which said engagement shoe (50) is fixed from coming out of the opening in the corresponding rail.

9. A method for covering a surface (3) with a cover (10) using a covering device as claimed in claim 6, in which:
   (a) the carriage is positioned at one end of the surface that is to be covered, with one transverse edge of the cover secured to this end of the surface and the rest of the cover being rolled up around the drum,
   (b) the carriage is advanced in the first direction over the surface that is to be covered along the rails (6), and thus the cover is unrolled from the drum and deployed over the surface portion downstream of the drum while at the same time the bead (12) of each longitudinal edge of the cover is guided and kept facing the opening (14) of the corresponding rail (6) as the drum gradually advances,
   (c) using the engagement shoe, the bead is forced into the opening (14) in the rail and guided under the adjacent flange (6a) of said rail, where
   (d) the bead is blocked therein by the immediately subsequent insertion into the same opening of the lateral section (31a) of the belt directly adjacent to the first roller (33*av*) downstream in the direction of translation of the carriage.

10. A method for covering a surface (3) with a cover (10) using a covering device as claimed in claim 6, in which:
   (a) the carriage is positioned at one end of the surface that is to be covered, with one transverse edge of the cover secured to this end of the surface and the rest of the cover being rolled up around the drum,
   (b) the carriage is advanced in the first direction over the surface that is to be covered along the rails (6), and thus the cover is unrolled from the drum and deployed over the surface portion downstream of the drum while at the same time the bead (12) of each longitudinal edge of the cover is guided and kept facing the opening (14) of the corresponding rail (6) as the drum gradually advances,
   (c) using the engagement shoe, the bead is forced into the opening (14) in the rail and guided under the adjacent flange (6a) of said rail, where
   (d) the bead is blocked therein by the immediately subsequent insertion into the same opening of the lateral section (31a) of the belt directly adjacent to the first roller (33*av*) downstream in the direction of translation of the carriage.

11. The device as claimed in claim 1, in which the rail is a C-section comprising, in addition to the adjacent flange (6a) a distal second flange (6b) separated from the surface that is to be covered by the opening (14) and the adjacent flange (6a) and partially closing the opposite side of the opening (14) closed by the adjacent flange (6a) and in which each engagement shoe (50) comprises a protruding step (53) extending under the distal flange (6b) or under the adjacent flange (6a) of the corresponding rail and preventing said engagement shoe (50) and, therefore, said mechanism for longitudinal translation to which said engagement show (50) is fixed, from coming out of the opening in the corresponding rail.

12. The device as claimed in claim 11, comprising a securing shoe (60) slipped into each rail and situated between the corresponding deflection pulley (13) and the second roller (33*am*), said securing shoe comprising:
   an upper portion situated outside the rails and fixed to the mechanism for longitudinal translation in such a way as to move along the rails with the drum, and
   a lower portion, inserted in the opening (14) in the corresponding rail, said lower portion comprising a protruding step extending under the distal flange (6b) of the corresponding rail and preventing said securing shoe (60) and therefore assisting the engagement shoe (50) in preventing said mechanism for longitudinal translation to which it is fixed from coming out of the opening in the corresponding rail.

13. The device as claimed in claim 11, in which the engagement shoe comprises a structure made of polymer and a reinforcing insert (70) made of metal or made of fiber-reinforced composite in order to stiffen the engagement shoe locally.

14. The device as claimed in claim 13, wherein:
   the reinforcing insert is in the shape of an L or of an inverted T, with a horizontal first portion (70H) reinforcing the step (53) and a vertical portion (70V), normal to the horizontal portion and extending from the lower portion (50Y) to the upper portion (50X) of the engagement shoe, and the polymer structure comprises a cavity into which the vertical portion of the reinforcing insert is inserted or a depression in a lower part of the step, so that all the surfaces of the engagement shoe which are in contact with the rail are surfaces of the structure made of polymer.

15. The device as claimed in claim 1, in which the deflection surface (13) is at least partially formed of an interior surface of a slot (52) arranged in the upper portion (50X) of the engagement shoe (50):

said slot having a face opening extending over a surface parallel to the corresponding rail (6) and facing towards the surface that is to be covered, said opening having a width less than the dimension of the bead (12) located inside the slot and greater than the thickness of the cover (10) which comes out of the slot via said opening, so that the cover can slide along the slot but the bead cannot leave the slot via the face opening, and said slot comprises a curved cross section allowing the bead of the cover (10) to be brought tangentially toward the lower portion (50Y) of the engagement shoe and thus under the adjacent flange (6a) of the corresponding rail.

16. The device as claimed in claim 15, in which the upper portion of the engagement shoe comprises a substantially cylindrical deflection pulley (13w) mounted with rotation about an axis parallel to the transverse direction of the cover, said deflection pulley having a distal end (13d) distant from the surface that is to be covered, and a proximal end (13p) adjacent to said surface, and in which the curved section is formed at least partially of the distal end (13d) of the deflection pulley against which the corresponding bead of the cover which is partially wrapped around said deflection pulley (13) rests in order to change orientation.

17. The device as claimed in claim 15, in which the distal end (13d) of each deflection pulley (13) situated on either side of the surface to be covered bears against the corresponding bead (12) thus applying a tensile stress to the cover in the transverse direction as it is unrolled, said stress being maintained as the cover (10) is being locked into the rails (6).

18. The device as claimed in claim 15, additionally comprising a tensioning bearing (15) mounted with the ability to rotate on each engagement shoe (50) about a transverse axis of rotation.

19. The device as claimed in claim 18, wherein the transverse axis of rotation is normal to the transverse edges of the cover and which guides the bead of the cover to the slot (13) of the corresponding engagement shoe.

* * * * *